United States Patent
Branstad et al.

(10) Patent No.: US 6,498,782 B1
(45) Date of Patent: Dec. 24, 2002

(54) COMMUNICATIONS METHODS AND GIGABIT ETHERNET COMMUNICATIONS ADAPTER PROVIDING QUALITY OF SERVICE AND RECEIVER CONNECTION SPEED DIFFERENTIATION

(75) Inventors: Mark William Branstad, Rochester, MN (US); Jonathan William Byrn, Kasson, MN (US); Gary Scott Delp, Rochester, MN (US); Philip Lynn Leichty, Rochester, MN (US); Todd Edwin Leonard, Williston, VT (US); Gary Paul McClannahan, Rochester, MN (US); John Emery Nordman, Rochester, MN (US); Kevin Gerard Plotz, Byron, MN (US); John Handley Shaffer, Rochester, MN (US); Albert Alfonse Slane, Oronoco, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/243,956

(22) Filed: Feb. 3, 1999

(51) Int. Cl.⁷ .......................... G06F 11/00; H04L 12/28
(52) U.S. Cl. ...................... 370/231; 370/236; 370/397; 34/825.51
(58) Field of Search ................................ 370/229, 230, 370/231, 232, 235, 236, 237, 395.4, 395.41, 395.7, 397, 399, 412, 465, 466, 474, 476, 509; 340/825.5, 825.51; 379/419; 707/227; 348/467, 512, 518

(56) References Cited

U.S. PATENT DOCUMENTS

| 5,533,009 | A | | 7/1996 | Chen |
| 5,533,020 | A | * | 7/1996 | Byrn et al. ............... 370/395.4 |
| 5,535,201 | A | * | 7/1996 | Zheng ..................... 340/825.51 |
| 5,548,587 | A | | 8/1996 | Bailey et al. |
| 5,579,312 | A | * | 11/1996 | Regache ..................... 370/397 |
| 5,629,928 | A | * | 5/1997 | Calvignac et al. .......... 370/237 |
| 5,652,749 | A | | 7/1997 | Davenport et al. |
| 5,694,548 | A | | 12/1997 | Baugher et al. |
| 5,761,427 | A | | 6/1998 | Shah et al. |
| 5,844,890 | A | | 12/1998 | Delp et al. |
| 5,898,668 | A | | 4/1999 | Shaffer |
| 5,909,443 | A | * | 6/1999 | Fichou et al. ............... 370/236 |
| 5,918,074 | A | | 6/1999 | Wright et al. |
| 5,956,341 | A | | 9/1999 | Galand et al. |
| 5,991,867 | A | | 11/1999 | Fosmark |
| H1880 | H | * | 10/2000 | Vines et al. ................. 370/310 |
| 6,215,772 | B1 | * | 4/2001 | Verma ......................... 370/231 |
| 6,233,250 | B1 | | 5/2001 | Liu et al. |
| 6,259,699 | B1 | | 7/2001 | Opalka et al. |

OTHER PUBLICATIONS

"A Control–Theoretic Approach to Flow Control", by Srinivasan Keshav, Computer Communications Review, V 21, N 4, Sep. 1991, pps. 3–15.

"Congestion Avoidance and Control", by Van Jacobson, (List continued on next page.)

Primary Examiner—Alpus H. Hsu
Assistant Examiner—Afsar Qureshi
(74) Attorney, Agent, or Firm—Joan Pennington

(57) ABSTRACT

A method and Gigabit Ethernet communications adapter are provided for implementing communications in a communications network. A transmission queue is defined of data to be transmitted. A transmission rate is set for the transmission queue. Data to be transmitted are enqueued on the transmission queue. The transmission queue can be subdivided into multiple priority queues, for example, using time wheels, and a transmission rate is set for each transmission queue.

15 Claims, 11 Drawing Sheets

OTHER PUBLICATIONS

Computer Communications Review, V 18, N 4, Sep. 1988, pps. 314–328.

"POS–PHY™ Saturn Compatible Packet Over Sonet Interface Specification for Physical Layer Devices (Level 2)" by PMC–Sierra, Inc. Saturn Group, Issue 2, Jan, 1998.

"Traceroute Command", Section 8 of AIX Base Operting System Commands, ©1998 IBM Corporation.

RFC 2171, "Multiple Access Protocol Over SONET/SDH, Version 1", by K. Murakami and M. Maruyama, Jun., 1997.

Patent Application( RO998–180), copending Ser. No. , filed on the same date as the present application, entitled: Communications Adapter for Implementing Communications in a Network and Providing Multiple Modes of Communications, by Branstad et al.

Patent Application (R0998–259), copending Ser. No. , filed on the same date as the present appliction, entitled: Cell/Frame Scheduling Method and Communications Cell/Frame Scheduler, by Delp, et al.

Patent Application (RO998–155), copending Ser. No. 09/166,004, filed on Oct. 2, 1998 and entitled: Memory Controller with Programmable Delay Counter for Tuning Performance Based on Timing Parameter of Controlled Memory Storage Device, by Gary P. McClannahan.

Patent Application (RO998–185), Ser. No. 09/223,056, filed Dec. 30, 1998 entitled: Method and Apparatus for User Programmable Packet to Connection Translation, by Albert A. Slane.

Patent Application (RO996–150), "An Earliest Deadline First Communications Cell Scheduler and Scheduling Method for Transmitting Earliest Deadline Cells First", By Delp et al., Ser. No. 08/823,155, filed Mar. 25, 1997.

* cited by examiner

FIG. 5

RATE SETTING MECHANISM 412

A PRIORI KNOWLEDGE 502

SNMP DISCOVERY/PROBING 504

BUILD NETWORK MAP 506

PREDICT ROUTE 508

PREDICT BOTTLENECK LINK (BL) 510

SET RATE TO BL RATE 512

HEURISTIC 514

| PACKET PAIR L1, L2 | LINK SPEED | TIME |
|---|---|---|
| L1 SIZE | | |
| 1500 BYTES | 1G | 12 MICROSEC. |
| 1500 BYTES | 100 M | 120 MICROSEC. |
| 1500 BYTES | 10 MB | 1.2 MICROSEC. |
| 1500 BYTES | 56K | 2/10 MILLISEC. |
| L2 SIZE | | |
| 40 BYTES | 1G | 320 NANOSEC. |
| 40 BYTES | 100 M | 3.2 MICROSEC. |
| 40 BYTES | 10 MB | 32 MICROSEC. |
| 40 BYTES | 56K | 5.7 MILLISEC. |
| ACK RANGE | 1G ----> 1G | ~ 12-13 MICROSEC. |
| | 1G ----> 100 M | ~ 120-124 MICROSEC. |
| | 1G ----> 10 M | ~ 1.2 MILLISEC. |
| | 1G ----> 56 K | ~ 0.2 SEC. |

COMMUNICATIONS METHODS AND GIGABIT ETHERNET COMMUNICATIONS ADAPTER PROVIDING QUALITY OF SERVICE AND RECEIVER CONNECTION SPEED DIFFERENTIATION

FIELD OF THE INVENTION

The present invention relates generally to the data processing field, and more particularly, relates to a method and communications adapter apparatus for implementing communications over a data communications network.

DESCRIPTION OF THE RELATED ART

An Asynchronous Transfer Mode (ATM) network described in "ATM: Theory and Application" by David E. McDysan and Darren L. Spohn, McGraw-Hill, 1994 is an internationally agreed upon technique for transmission, multiplexing and switching in a broadband network. ATM networks are designed to support the integration of high quality voice, video, and high speed data traffic. ATM networks use fixed size cells as a unit of transmission. As technology increases, it is expected that the Asynchronous Transfer Mode (ATM) technology and ATM networks will supply much of the need for high speed network interconnection.

In the face of emerging proprietary optical transmission protocols, SONET (Synchronous Optical Network) was provided as an open standard for synchronous data transmission on optical media. The standard was approved in 1988 by the predecessor to today's International Telecommunication Union, and in 1989 by the American National Standards Institute. SONET is widely deployed in the US. Using time division multiplexing, SONET works by dividing a fiber transmission path into multiple logical channels called tributaries. A tributary's basic unit of transmission is an STS-1 (synchronous transport signal, level 1) or OC-1 (optical carrier, level 1) signal. STS describes a transmission's signals while in an electrical state, and OC describes the same traffic after being converted into optical signals. STS-1 and OC-1 both operate at 51.84 Mbps. OC-2 is twice as fast, OC-3 is three times as fast, and so on. SONET is based on direct synchronous multiplexing, where separate signals are multiplexed directly into higher speed signals. For example, an OC-12 circuit might carry traffic from four OC-3 links. SONET line rates are currently operating up to OC-192 (9.953 Gbps). This is considerably faster than ATM's maximum current rate of 622 Mbps or Ethernet's current rate of 1 Gbps.

Ethernet is the original and still common name for the communications technique that has been standardized by the IEEE as some of the 802.x standards. 802.3 is the general Ethernet standard and 802.x are the link layer standards covering a variety of speeds.

A Packet over SONET communications interface is described in "POS-PHY™ SATURN COMPATIBLE PACKET OVER SONET INTERFACE SPECIFICATION FOR PHYSICAL LAYER DEVICES (Level 2)" by PMC-Sierra, Inc. Saturn Group, Issue 2, Jan. 1998. Also, RFC 2171 documents a multiple access protocol for transmission of network-protocol datagrams, encapsulated in High-Level Data Link Control (HDLC) over SONET/SDH (Synchronous Digital Hierarchy).

Asynchronous Transfer Mode or ATM is a communication technology whose use is becoming more widespread in some areas while receiving competitive competition from Gigabit Ethernet and Packet Over SONET (POS) in other areas. The system designer and Information System administrator is faced with the daunting task of choosing one technology over another, and allocating scarce development resource to optimize in their individual system one or another of these technologies. If there were a way to isolate the differences of these various technologies from the preparation for the use of the technology, the benefits would be widespread. Additionally, the various technologies provide differing utility. If there were a way to provide the quality of service differentiation available from ATM with POS and Ethernet, for example, again, the benefits would be widespread.

A related patent application is copending Ser. No. 09/143,858, filed on the same date as the present application, entitled: COMMUNICATIONS ADAPTER FOR IMPLEMENTING COMMUNICATIONS IN A NETWORK AND PROVIDING MULTIPLE MODES OF COMMUNICATIONS, by Branstad et al., and assigned to the present assignee. The subject matter of the above identified patent application is incorporated herein by reference.

A related patent application is copending Ser. No. 09/244,548, filed on the same date as the present application, entitled: CELL/FRAME SCHEDULING METHOD AND COMMUNICATIONS CELL/FRAME SCHEDULER, by Delp, et al., and assigned to the present assignee. The subject matter of the above identified patent application is incorporated herein by reference.

A need exists for a Gigabit Ethernet communications adapter that has the capability of providing quality of service (QoS) and intermediate link and/or receiver connection speed differentiation.

SUMMARY OF THE INVENTION

Important objects of the present invention are to provide an improved method and Gigabit Ethernet communications adapter for providing quality of service and intermediate link and/or receiver connection speed differentiation; and to provide such method and apparatus that overcome disadvantages of prior art arrangements.

In brief, a method and Gigabit Ethernet communications adapter for implementing communications in a communications network. A transmission queue is defined of data to be transmitted. A transmission rate is set for the transmission queue. Data to be transmitted are enqueued on the transmission queue.

In accordance with features of the invention, the transmission queue can be subdivided into multiple priority queues and a transmission rate is set for each transmission queue.

BRIEF DESCRIPTION OF THE DRAWINGS

The present invention together with the above and other objects and advantages may best be understood from the following detailed description of the preferred embodiments of the invention illustrated in the drawings, wherein:

FIG. 5 is a diagram illustrating a rate setting mechanism of the communications adapter of the preferred embodiment of FIG. 4;

DETAILED DESCRIPTION OF THE PREFERRED EMBODIMENTS

Figure 1:
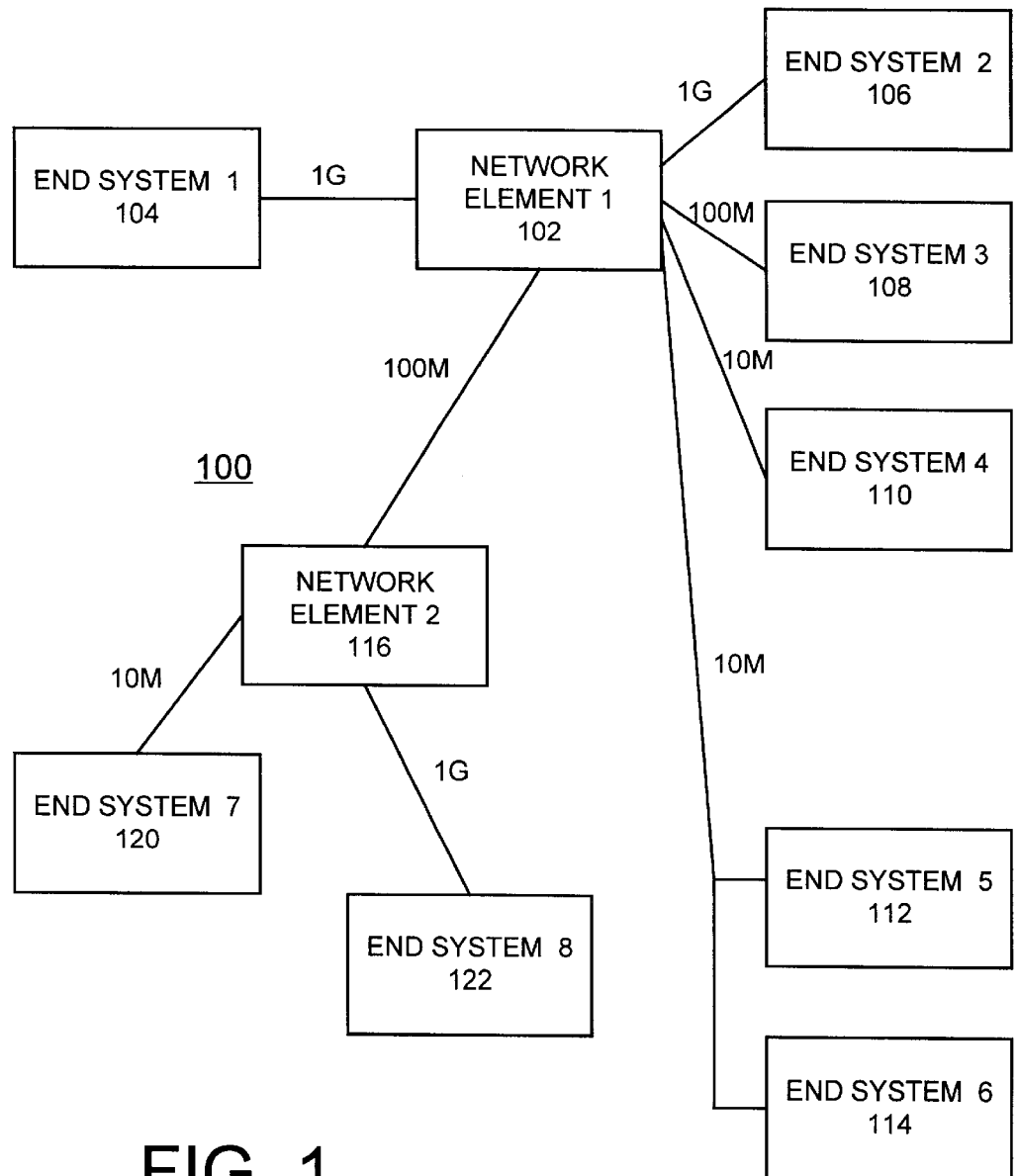
FIG. 1 is a block diagram representation illustrating a communications network system including communications adapters of the preferred embodiment.

Having reference to FIG. 1, there is shown a communications system generally designated by the reference character 100 that advantageously may be used with a communication adapter 400 of the preferred embodiment. Communications system 100 includes a first network element 1, 102 connected to end stations 1–6, 104, 106, 108, 110, 112, and 114 and connected to a second network element 2, 116. Network element 2, 116 is also connected to a pair of end stations 7–8, 120 and 122.

A connection speed is indicated with respective network links, such as 1 G, indicating a Gigabit Ethernet rate of 1 Gbps, between network element 1, 102 and both end systems 1–2, 104 and 106, and between network element 2, 116 and end system 8, 122. A plurality of network links labeled 10 M indicating a rate of 10 Mbps, respectively connects end station 4, 110 to network element 1, 102; both end stations 5 and 6, 112, 114 to network element 1, 102; and end station 7, 120 to network element 2, 116. End station 3, 108 is connected to network element 1, 102 by a network link labeled 100 M indicating a rate of 100 Mbps. Network elements 1 and 2 102 and 116 are connected by a network link labeled 100 M indicating a rate of 100 Mbps.

In accordance with features of the present invention, Gigabit Ethernet communications adapter 400 of the preferred embodiment has the capability of providing quality of service (QoS) and intermediate link and/or receiver connection speed differentiation. As illustrated in FIG. 1, the bandwidth speed of a network link, such as the 100 Mbps link connecting network elements 1 and 2, 102, 116 is a bottleneck link, for example for communications between end systems 1 and 8, 104 and 122. When traffic is going between end station 1, 104 and end station 5, 112, the 10 Mbps link between network element 1, 102 and end station 5, 112 is the bottleneck link. For traffic between end station 1, 104 and end station 8, 122, the 100 Mbps link between network element 1, 102 and network element 2, 116 is the bottleneck link. Gigabit Ethernet communications adapter 400 uses, for example, simple network management protocol (SNMP) discovery probing as illustrated and described with respect to FIG. 5, to identify the bottleneck link (BL) rate and to set the transmission rate to the BL rate.

Figure 1A:
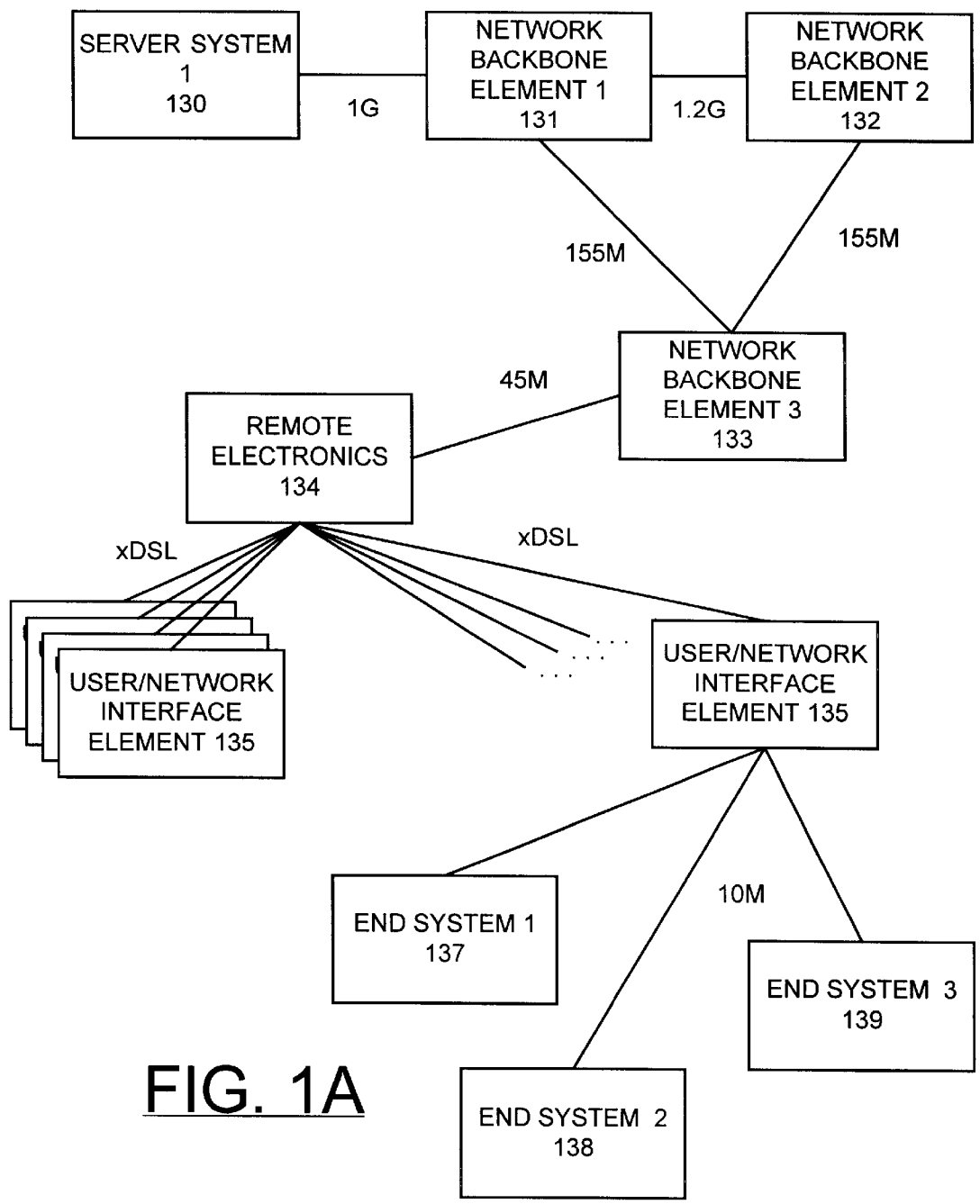
FIG. 1A is a block diagram representation illustrating an alternate communications network system including communications adapters of the preferred embodiment.

While the exposition of these techniques may be understood in reference to Gigabit and addition speeds of Ethernet, one skilled in the art will recognize that the structures, mechanisms, and processes described herein can be generally applied to the digital communication environment with multiple access or link speeds or varying grades of quality of service. FIG. 1A shows an alternative environment, with a server system 1 130 that uses an undifferentiated media, connected to an ATM backbone for distribution to trunks to remote electronics. As shown in FIG. 1A, network backbone elements 1, 2, 3, 131, 132 and 133 are coupled to the server system 1 130. Network backbone element 3 133 is connected to remote electronics 134 via a link labeled 45 M. From the remote electronics 134, Digital subscriber links (xDSL) carry data to user/network interface elements 135 and multiple end systems 1, 2, 3, 137, 138, and 139 (homes and offices), when the data is then carried over higher speed Ethernets. In the network bottleneck links (BLs), traffic to a group may go through a BL and a transmission rate to the group advantageously may be limited to the BL rate.

Figure 2:
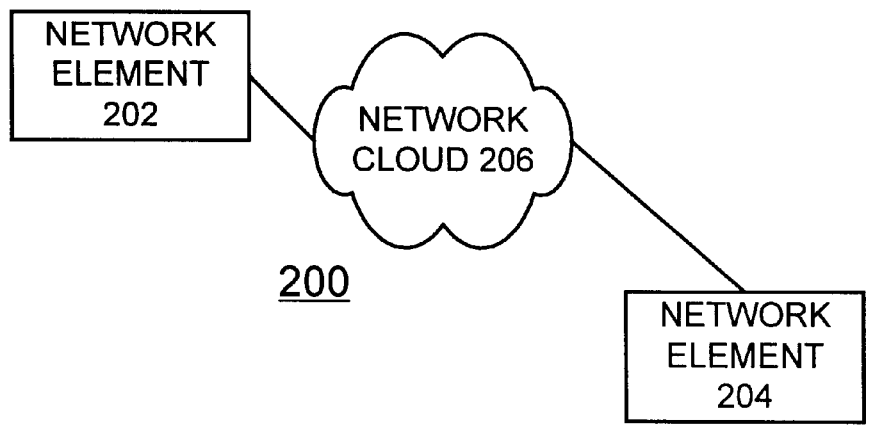
FIGS. 2 and 3 are block diagram representations illustrating first and second alternative communications network systems including communications adapters of the preferred embodiment.
Figure 3:
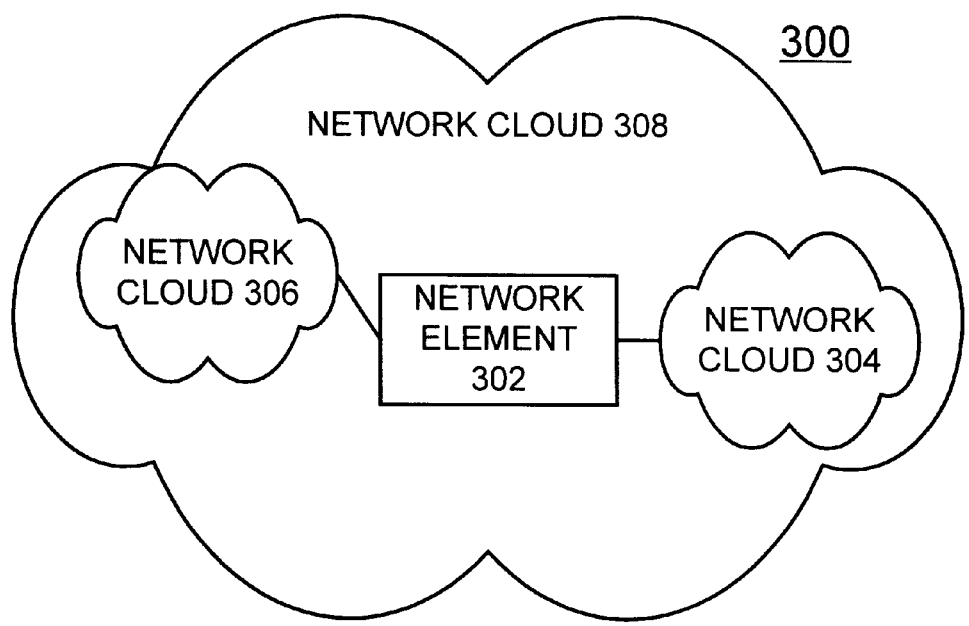

FIGS. 2 and 3 illustrate first and second alternative communications network systems 200 and 300 advantageously including communications adapters 400 of the preferred embodiment. In communications network system 200, a pair of network elements 202 and 204 are connected by a network cloud 206. Network cloud may optionally include 1 M, 10 M, 100 M, 1 G, or other speed Ethernet, frame relay, asymmetric digital subscriber line (ADSL), integrated services digital network (ISDN), Asynchronous Transfer Mode (ATM), Packet Over SONET (POS), and point to point protocol (PPP). This list is not meant to be exhaustive; one skilled in the art will appreciate that the techniques and methods herein described can be advantageously applied to other types of communication links and networks.

In communications network system 300 of FIG. 3, a network element 302 includes the communications adapter 400 the preferred embodiment. Network element 302 is connected to a pair of network clouds 304 and 306 located with a network cloud 308.

Figure 4:
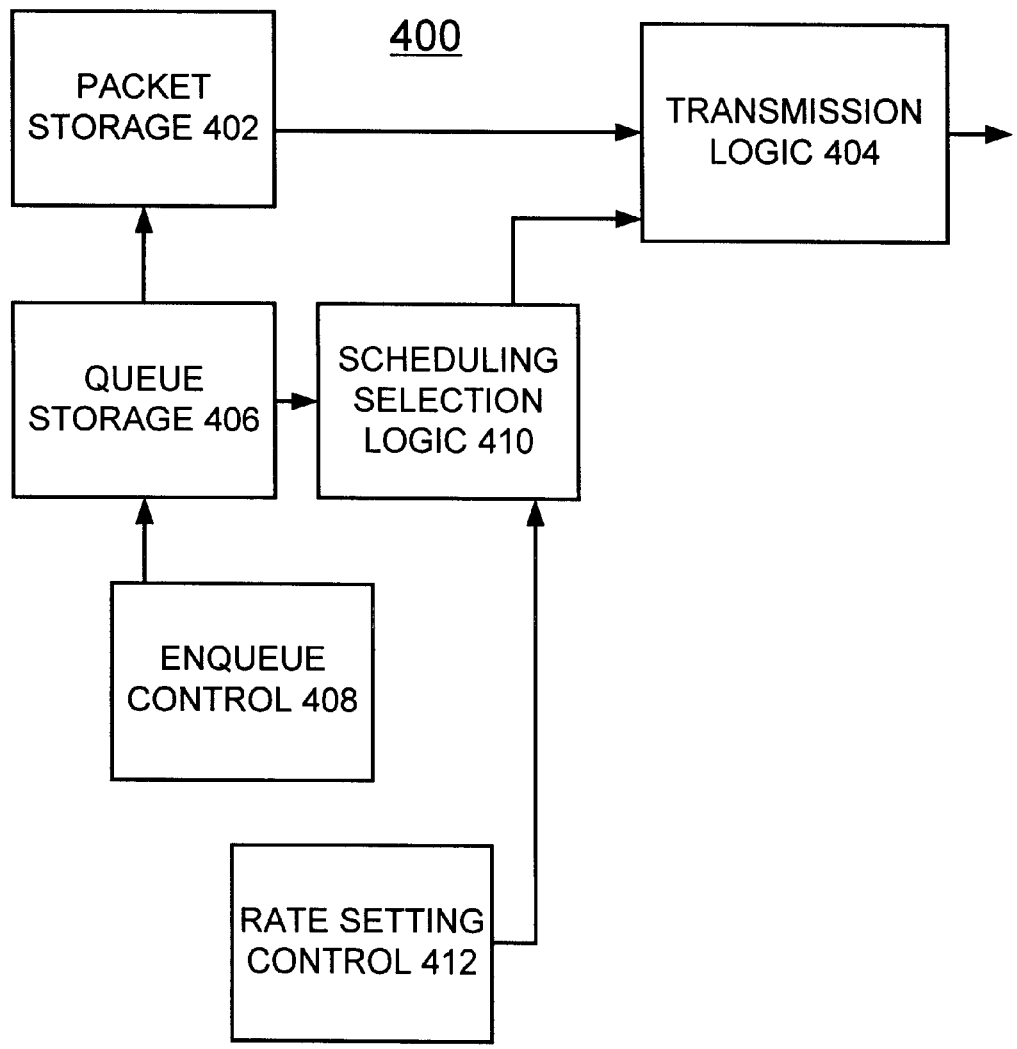
FIG. 4 is a block diagram representation illustrating a communications adapter of the preferred embodiment of FIGS. 1–3.

FIG. 4 illustrates the communications adapter 400 the preferred embodiment. Communications adapter 400 includes a packet storage 402 coupled to a transmission logic block 404. Transmission logic 404 is connected to a network output link. A queue storage 406 operatively controlled by an enqueue control 408 is coupled to the packet storage 402 and to a scheduling selection logic 410. Queue storage 406 store enqueued cells and/or frames. A rate setting control 412 provides a rate input to the scheduling selection logic 410. Scheduling selection logic 410 selects a packet for transmission and utilizes the rate input from the rate setting control 412.

Figure 4A:
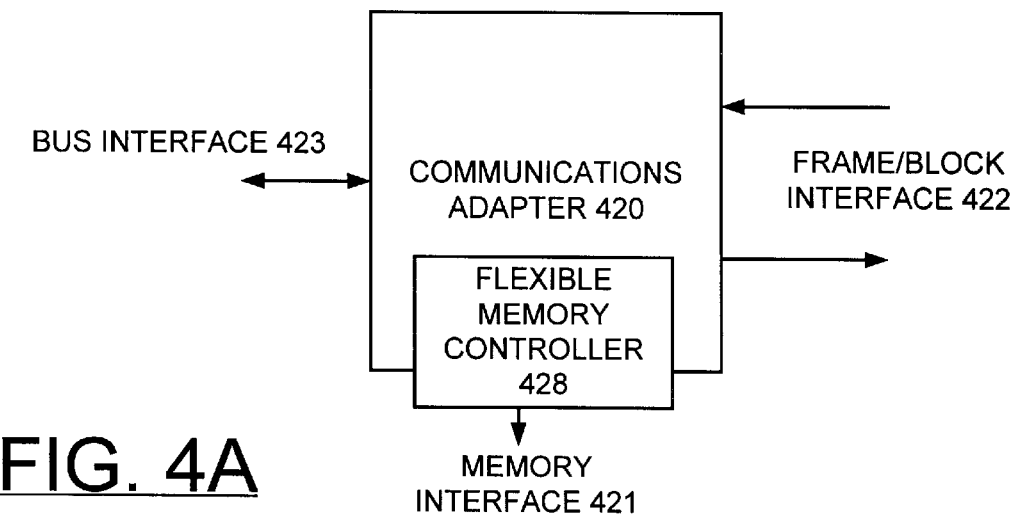
FIGS. 4A and 4B are block diagram representations illustrating a first communications adapter and second communications adapter of the preferred embodiment.
Figure 4B:
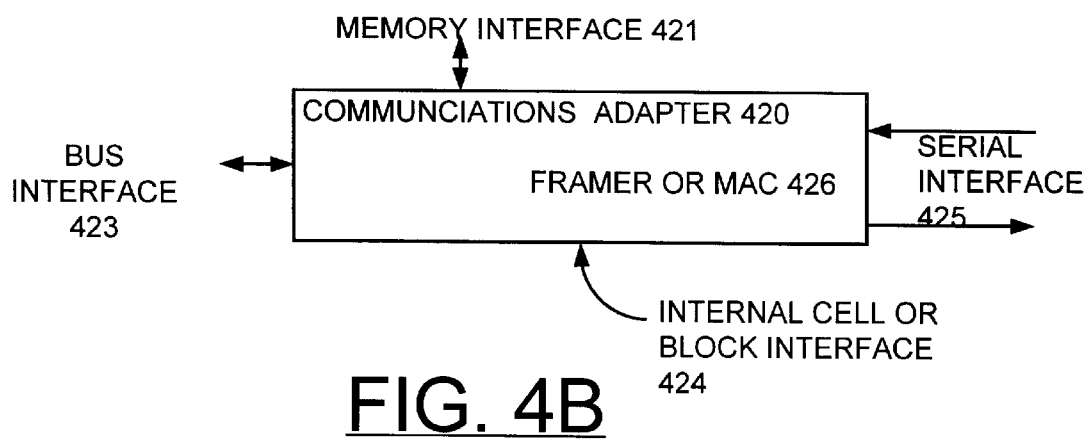

Referring now to FIGS. 4A and 4B, there are shown communications adapter chip arrangements of the preferred embodiment including a communications adapter 420 in FIG. 4A. In FIG. 4A, first communications adapter 420 includes a memory interface 421, a frame/block interface 422, and a bus interface 423. In FIG. 4A, a flexible memory controller 428 is coupled to the memory interface 421. In FIG. 4B, communications adapter 420 includes a memory interface 421, a bus interface 423, an internal frame/block interface 424, and a serial interface 425 connected to a framer or media access control (MAC) 426. The internal cell/block interface 424 is not recognizable outside the second communications adapter chip 420.

A related patent application is copending Ser. No. 09/166, 004, filed on Oct. 2, 1998 and entitled: MEMORY CONTROLLER WITH PROGRAMMABLE DELAY COUNTER FOR TUNING PERFORMANCE BASED ON TIMING PARAMETER OF CONTROLLED MEMORY STORAGE DEVICE, by Gary P. McClannahan, and assigned to the present assignee. The subject matter of the above identified patent application is incorporated herein by reference.

Figure 4C:
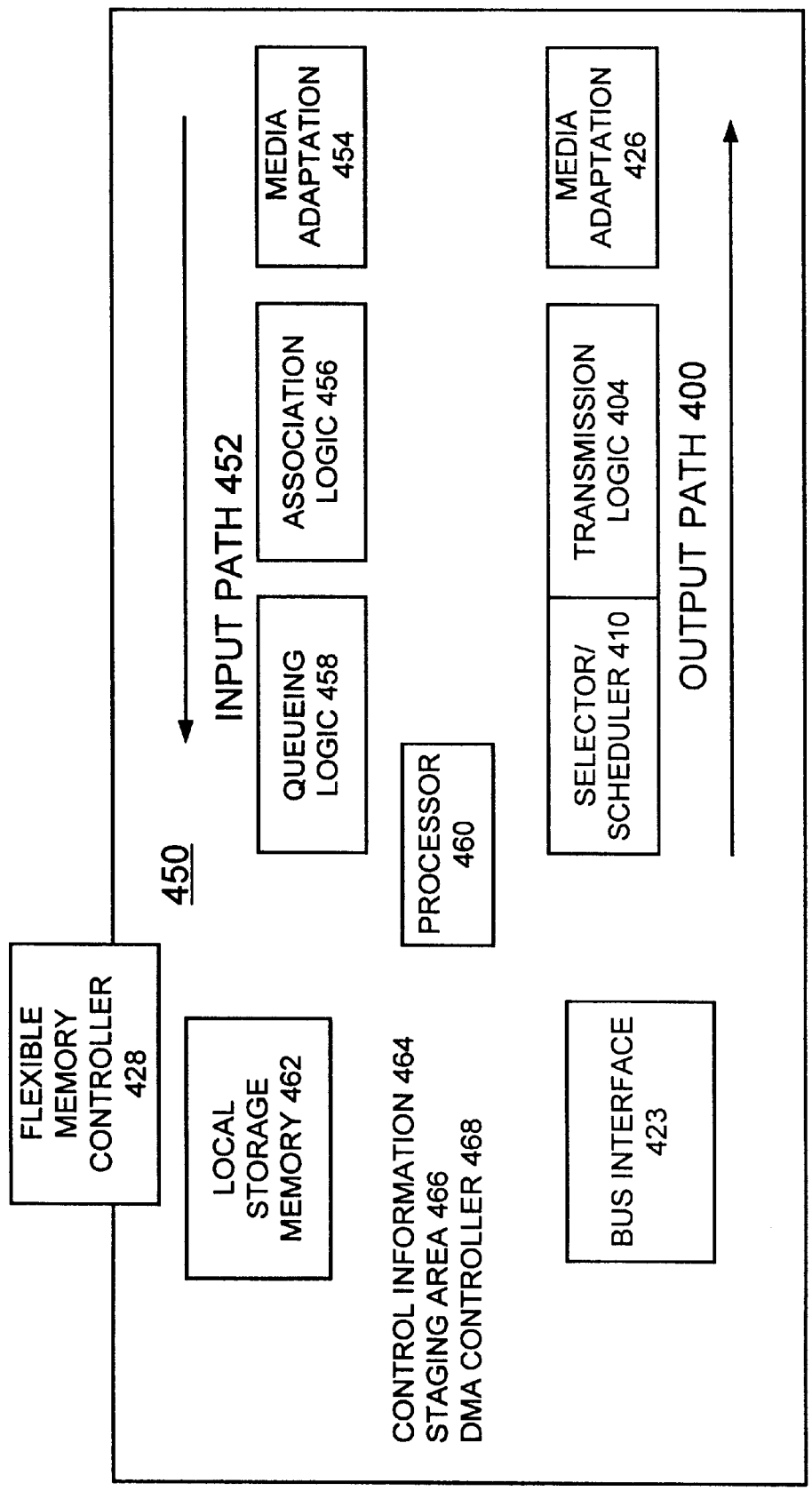
FIG. 4C is a block diagram representation illustrating another communications adapter arrangement of the preferred embodiment.

FIG. 4C is a block diagram representation illustrating a communications adapter circuit arrangement generally designated by the reference character 450 of the preferred embodiment. Communications adapter circuit 450 includes an output path 400 as illustrated and described in FIG. 4 and an input path 452 as shown in FIG. 4C. As shown in FIG. 4C, input path 452 includes a media adaptation block 454, an association logic block 456, and a queuing logic block 458. The association logic 456 provides a method for associating incoming data with state information. Output path 400 includes selector/scheduler 410, transmission logic 404 and media adaptation block 426. When transmitting cells or buffers a segmenter is included in transmission logic 404. The selector/scheduler 410 of the output path 400 is a data movement mechanism for scheduling and for sequencing the selection of cells or frames to be transmitted. The transmission logic 404 enables the segmentation of frames or buffers into cells or frames, applied to the media adaptation layer 426. The media adaptation blocks 454 and 426 may be implemented by a transceiver and a framer or media access control (MAC). Communications adapter circuit 450 optionally includes a processor 460 having access to the input path 452 and/or the output path 400. The processor can optionally be a 32 bit PowerPC processor. This processor 460 may optionally be a 64 bit PowerPC processor. Communications adapter circuit 450 may optionally contain hardwired state machines, micro-coded programmable processors, and/or stored program, register and memory-based processors for the manipulation of the transmit and receive data to implement processor 460.

Communications adapter circuit 450 includes bus interface 423, for example, a PCI bus, a local storage memory 462 that optionally is used for storing control information 464, staging area 466 and DMA controller 468. The local storage memory 462 can be used for intermediate storage of received data. The local storage memory 462 for storing control information 464 may be implemented with on-chip memory within adapter circuit 450 and/or separate static RAM or dynamic RAM or other storage devices. Optionally, communications adapter circuit 450 may include the flexible memory controller 428 by which one or more of a variety of memory devices are connected to the controller 428. This would allow the support of a variety of memory of various types of memory while providing a constant functionality of a basic memory mechanism.

FIG. 5 is a diagram illustrating a rate setting control 412 of the communications adapter 400 of the preferred embodiment. Rate setting control 412 optionally includes a priori knowledge 502; simple network management protocol (SNMP) discovery probing 504 including methods to build network map 506, predict route 508, predict bottleneck link (BL) 510, and set rate to BL rate 512; and heuristic methods 514. Heuristic methods 514 include a BL discovery method illustrated and described with respect to FIG. 9. Another heuristic method 514 is described by "A Control-Theoretic Approach to Flow Control", by Srinivasan Keshav, Computer Communications Review, V. 21, N. 4, September 1991, pps. 3–15.

A prior knowledge is used to initialize the connection classes in the form of default maximum rates, or preset priorities. This knowledge may come from, for example, a configuration data structure created using techniques outside of the scope of this application.

The Simple Network Management Protocol (SNMP) is a data communication network protocol which can be used to query various network devices about their configuration and neighborhood knowledge. The Simple Network Management Protocol is a protocol for Internet network management services. It is formally specified in a series of related RFC documents set forth in TABLE 1 below. (Some of these RFCs are in "historic" or "informational" status.)

TABLE 1

| RFC | Description |
| --- | --- |
| RFC 1089 | SNMP over Ethernet |
| RFC 1140 | IAB Official Protocol Standards |
| RFC 1147 | Tools for Monitoring and Debugging TCP/IP Internets and Interconnected Devices [superceded by RFC 1470] |
| RFC 1155 | Structure and Identification of Management Information for TCP/IP based internets. |
| RFC 1156 (H) | Management Information Base Network Management of TCP/IP based internets |
| RFC 1157 | A Simple Network Management Protocol |
| RFC 1158 | Management Information Base Network Management of TCP/IP based internets: MIB-II |
| RFC 1161 (H) | SNMP over OSI |
| RFC 1187 | Bulk Table Retrieval with the SNMP |
| RFC 1212 | Concise MIB Definitions |
| RFC 1213 | Management Information Base for Network Management of TCP/IP-based internets: MIB-II |
| RFC 1215 (I) | A Convention for Defining Traps for use with the SNMP |
| RFC 1224 | Techniques for Managing Asynchronously-Generated Alerts |
| RFC 1270 (I) | SNMP Communication Services |
| RFC 1303 (I) | A Convention for Describing SNMP-based Agents |
| RFC 1470 (I) | A Network Management Tool Catalog |
| RFC 1298 | SNMP over IPX (obsolete, see RFC 1420) |
| RFC 1418 | SNMP over OSI |
| RFC 1419 | SNMP over AppleTalk |
| RFC 1420 | SNMP over IPX (replaces RFC 1298) |

The network application "traceroute" is an application which, by manipulating the Internet Protocol (IP) header, is used to trace the route that may be taken by packets from the source 100, to the destination. Traceroute returns a list of intermediate nodes. SNMP queries are then sent to the list of intermediate nodes returned by traceroute.

SNMP queries can be used to determine the speed and occupancy of the interfaces along the path likely to be traveled. The minimum link speed of any connection in the route can be taken as the upper limit of transmission rate for connections due to travel through the link.

Figure 6:
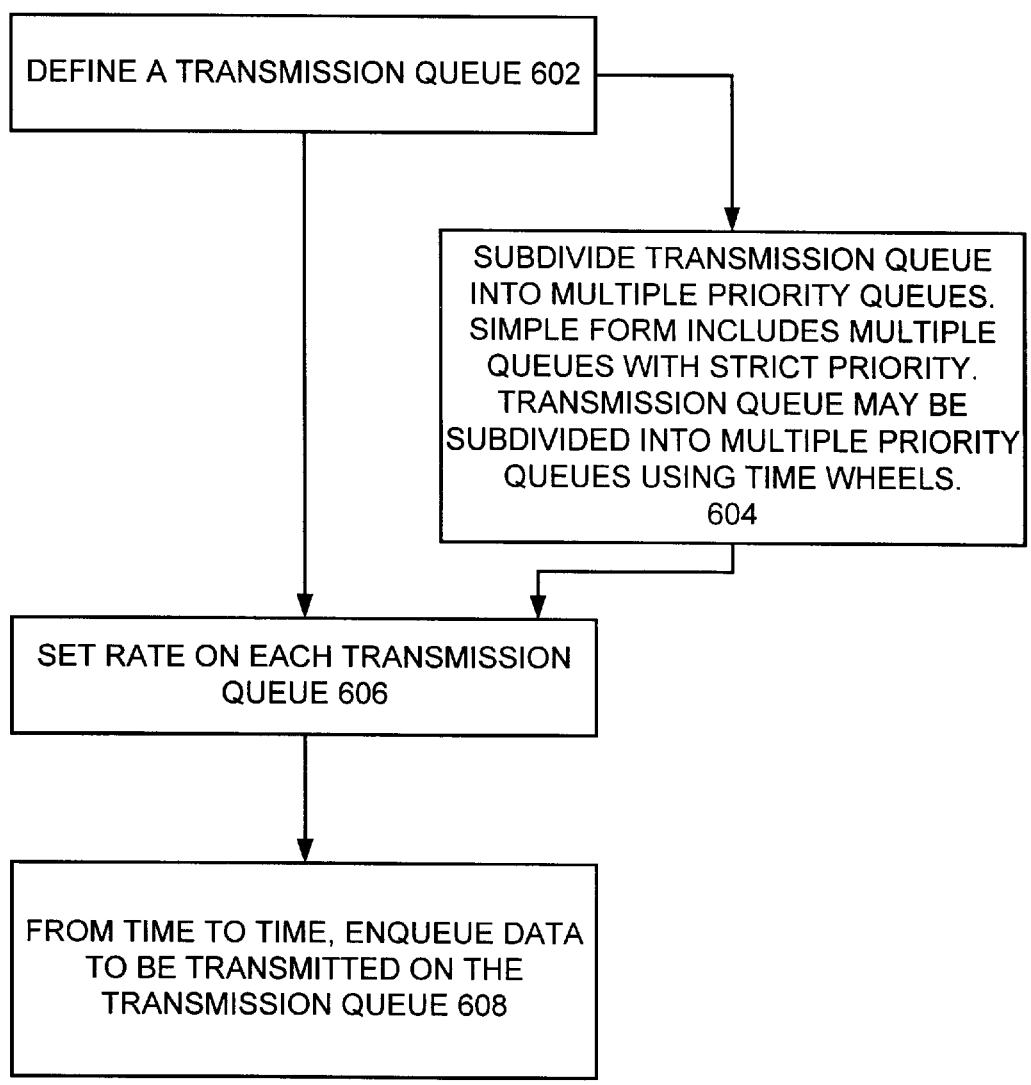
FIG. 6 is a flow diagram illustrating sequential operations of the communications adapter of the preferred embodiment of FIG. 4.

FIG. 6 illustrates sequential operations of the communications adapter 400. A transmission queue is defined as indicated at a block 602. Optionally the transmission queue may be subdivided into multiple priority queues as indicated at a block 604. For example, a simple form of the multiple priority queues include multiple queues with strict priority. Also, the transmission queue may be subdivided into multiple priority queues at block 604 using time wheels for scheduling cells and frames. A rate of transmission is set for each transmission queue as indicated at a block 606. Data is enqueued to be transmitted on the transmission queue as indicated at a block 608.

Figure 7:
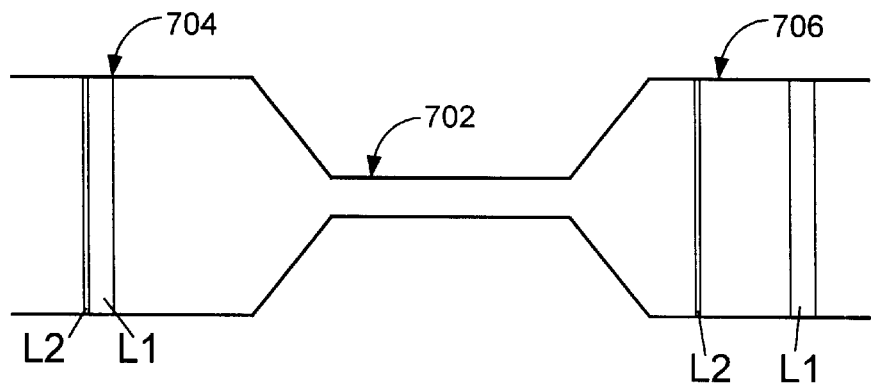
FIG. 7 is a diagram illustrating a communications bottleneck together with a chart of packet pair size, link speed and time values.

FIG. 7 is a diagram illustrating a communications bottleneck link 702 between two high bandwidth links 704 and 706 in a communication network, such as networks 100, 200 and 300. FIG. 7 provides a chart of packet pair L1, L2 including exemplary packet sizes, link speeds and time values together with acknowledgment time ranges for exemplary combinations of link speeds. More details are provided with respect to FIG. 9.

Figure 8:
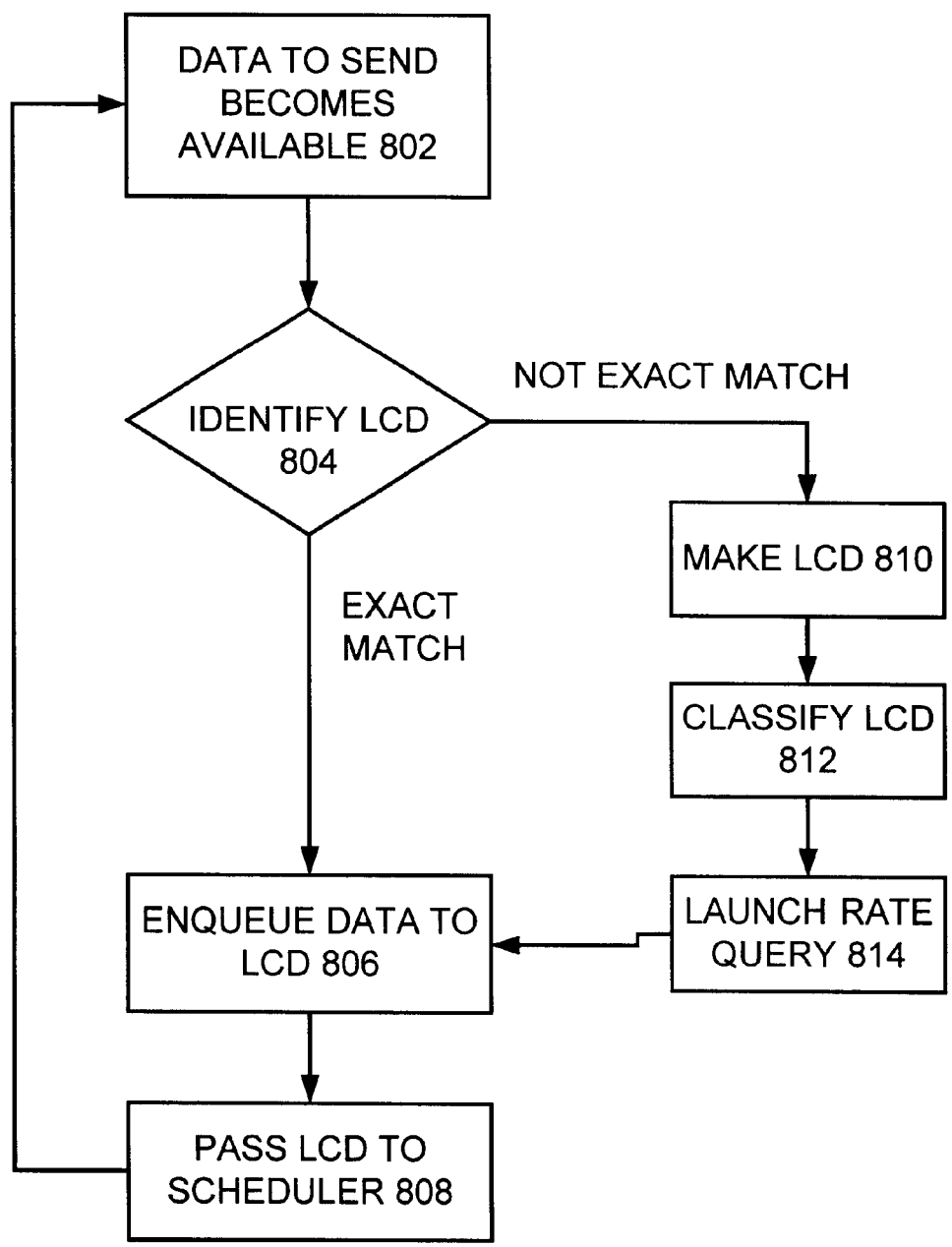
FIG. 8 is a flow diagram illustrating time wheel queuing sequential operations of the communications adapter of the preferred embodiment of FIG. 4.

FIG. 8 illustrates time wheel queuing sequential operations of the communications adapter 400. Data to send becomes available as indicated at a block 800. A traffic bucket or logical channel descriptor (LCD) is identified as indicated at a decision block 804. When an exact match is found at decision block 804, the data is enqueued to the LCD as indicated at a block 806. Then the LCD is passed to the scheduler as indicated at a block 808.

A related patent application is copending Ser. No. 09/244, 548, filed on the same date as the present application, entitled: CELL/FRAME SCHEDULING METHOD AND COMMUNICATIONS CELL/FRAME SCHEDULER, by Delp et al., and assigned to the present assignee. Scheduler or scheduling selection logic 410 is disclosed in this related application. The subject matter of the above identified patent application is incorporated herein by reference. Those skilled in the art will recognize that alternate scheduling mechanisms may be used, but the mechanism used must be capable of providing differentiated services to differentiated data flows over the same physical connection.

When an exact match is not found at decision block 804, a logical channel descriptor (LCD) is defined as indicated at a block 810 and the LCD classified as indicated at a block 812. A rate query is launched as indicated at a block 814. Then the data is enqueued to the LCD at block 806 and passed to the scheduler at block 808.

Figure 9:
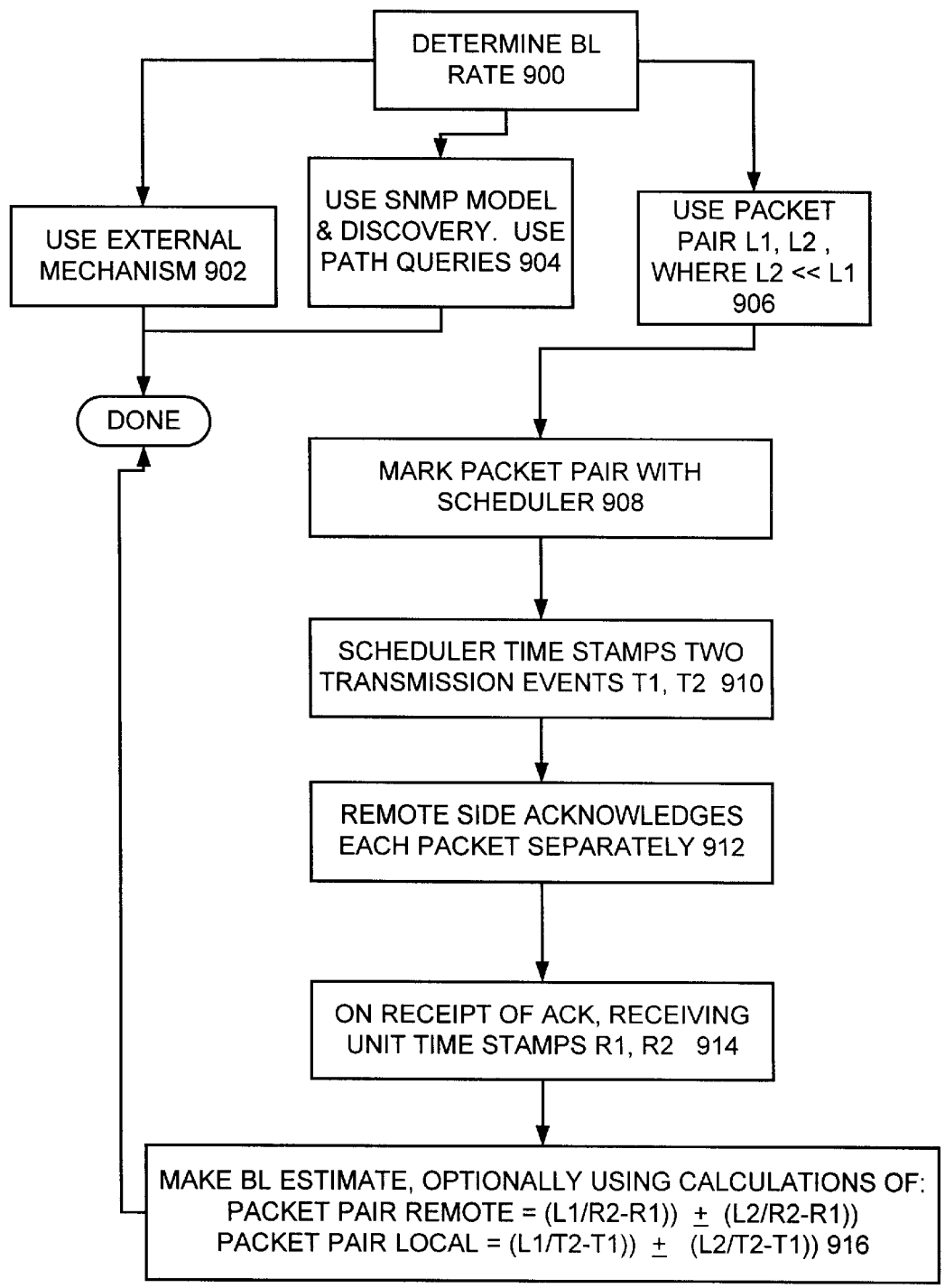
FIG. 9 is a flow diagram illustrating sequential bottleneck link discovery operations of the communications adapter of the preferred embodiment of FIG. 4.

FIG. 9 illustrates sequential bottleneck link (BL) discovery operations of the preferred embodiment of the communications adapter 400. A bottleneck link (BL) transmission rate is determined as indicated at a block 900. As indicated at a block 902, an external mechanism optionally is used to identify a BL rate, for example, such as disclosed by Van Jacobson, in the publication entitled "Congestion Avoidance and Control", Computer Communications Review, V 18, N 4, September, 1988, pps. 314–328. As indicated at a block 904, a SNMP model and discover optionally is used to identify a BL rate, using path queries as described in IBM product (identify). With the BL rate determined at either block 902 or block 904, this completes the operations. A packet pair including a long packet L1 followed by a short packet L2, where L2<<L1 is used as indicated at a block 906. The packet pair is marked in the scheduler as indicated at a block 908. The scheduler time stamps two transmission events as indicated at a block 910. The remote station acknowledges the packets L1, L2 separately as indicated at a block 912. On receipt of acknowledgment, receiving unit time stamps R1, R2 as indicated at a block 914. A BL estimate is made as indicated at a block 916 optionally utilizing calculations defined by:

PACKET PAIR REMOTE=$(L1/(R2-R1))\pm(L2/(R2-R1))$

PACKET PAIR LOCAL=$(L1/(T2-T1))\pm(L2/(T2-T1))$

A much more complex calculation that can be used to determine the bottleneck link rate is disclosed in the above-identified publication entitled: "A Control-Theoretic Approach to Flow Control" by Srinivasan Keshav.

While we have described Ethernet as an undifferentiated service, with the application of the techniques herein described, the media becomes capable of differentiated service. While we have referred to Gigabit Ethernet communications adapter 400 of the preferred embodiment, it should be understood that communications adapter 400 can be used with a variety of speeds.

More generally; while the present invention has been described with reference to the details of the embodiments of the invention shown in the drawing, these details are not intended to limit the scope of the invention as claimed in the appended claims.

What is claimed is:

1. The method for implementing communications in a communications network comprising the steps of:
   defining a transmission queue of data to be transmitted;
   setting a transmission rate for said transmission queue;
   enqueuing data to be transmitted on said transmission queue;
   utilizing a scheduler for scheduling the transmission of data packets; and
   utilizing said scheduler for marking a packet pair; said packet pair including a long packet followed by a short packet.

2. The method for implementing communications in a communications network as recited in claim 1 includes the step of transmitting data at a rate substantially limited to said set transmission rate for said transmission queue.

3. The method for implementing communications in a communications network as recited in claim 1 further includes the step of launching a rate query.

4. The method for implementing communications in a communications network as recited in claim 1 wherein the step of setting said transmission rate for said transmission queue includes the steps of limiting said transmission rate for said transmission queue to a predicted bottleneck link (BL) rate.

5. The method for implementing communications in a communications network as recited in claim 1 further includes the step of utilizing said scheduler for timing a first and a second transmission event for said packet pair.

6. The method for implementing communications in a communications network as recited in claim 5 further includes the step of providing a remote unit for separately acknowledging each packet of said packet pair.

7. The method for implementing communications in a communications network as recited in claim 6 includes the step of calculating a bottleneck link estimate utilizing an acknowledgment time stamp of each packet of said packet pair by said remote unit.

8. The method for implementing communications in a communications network as recited in claim 5 includes the step of calculating a bottleneck link estimate utilizing said first and said second transmission event for said packet pair.

9. A communications adapter for implementing communications in a communications network comprising:
   a transmission rate setting control, said transmission rate setting control setting a rate for transmitting data;
   a selector/scheduler, said selector/scheduler scheduling the transmission of data from a transmission queue responsive to said transmission rate; said selector/scheduler schedules the transmission of data packets, said scheduler/selector marks a packet pair, said packet pair including a long packet and a short packet; and
   a transmission interface, said interface transmitting data from said transmission queue across a transmission medium.

10. The communications adapter for implementing communications in a communications network as recited in claim 9, wherein said transmission rate setting control identifies said transmission rate.

11. The communications adapter for implementing communications in a communications network as recited in claim 10, wherein said transmission rate setting control initiates a rate query.

12. The communications adapter for implementing communications in a communications network as recited in claim 9, wherein said transmission rate setting control calculates a bottleneck rate.

13. The communications adapter for implementing communications in a communications network as recited in claim 9, wherein said transmission rate setting control limits said transmission rate for said transmission queue to a bottleneck rate.

14. An Ethernet communications adapter for implementing communications in an Ethernet communications network comprising:

an input path for receiving communications;

an output path for transmitting communications; said output path including;

a transmission queue interface, said queue interface accessing a transmission queue;

means for enqueuing, on said transmission queue, data to be transmitted, said means being responsive to a selected transmission rate; and a transmission interface, said transmission interface transmitting data from said transmission queue across a transmission medium.

15. The Ethernet communications adapter for implementing communications in an Ethernet communications network as recited in claim 14 further includes means for limiting said transmission rate for said transmission queue to a bottleneck rate.

* * * * *

UNITED STATES PATENT AND TRADEMARK OFFICE
CERTIFICATE OF CORRECTION

PATENT NO. : 6,498,782 B1
DATED : December 24, 2002
INVENTOR(S) : Mark William Branstad et al.

It is certified that error appears in the above-identified patent and that said Letters Patent is hereby corrected as shown below:

Column 10,
Line 5, after "queue;" insert -- means for subdividing said transmission queue into multiple priority queues using time wheels; --

Signed and Sealed this

Sixth Day of May, 2003

JAMES E. ROGAN
*Director of the United States Patent and Trademark Office*